(12) United States Patent
Huang

(10) Patent No.: US 9,077,787 B2
(45) Date of Patent: Jul. 7, 2015

(54) MOBILE TERMINAL

(75) Inventor: Zhulin Huang, Shenzhen (CN)

(73) Assignee: ZTE CORPORATION, Shenzhen, Guangdong Province (CN)

( * ) Notice: Subject to any disclaimer, the term of this patent is extended or adjusted under 35 U.S.C. 154(b) by 100 days.

(21) Appl. No.: 13/640,849

(22) PCT Filed: Jul. 21, 2011

(86) PCT No.: PCT/CN2011/077427
§ 371 (c)(1),
(2), (4) Date: Oct. 12, 2012

(87) PCT Pub. No.: WO2012/129866
PCT Pub. Date: Oct. 4, 2012

(65) Prior Publication Data
US 2014/0011539 A1    Jan. 9, 2014

(30) Foreign Application Priority Data
Mar. 28, 2011    (CN) .......................... 2011 1 0075522

(51) Int. Cl.
*H05B 1/00* (2006.01)
*H04M 1/02* (2006.01)
*G06F 1/16* (2006.01)

(52) U.S. Cl.
CPC .......... *H04M 1/0202* (2013.01); *H04M 1/0283* (2013.01); *G06F 1/1647* (2013.01)

(58) Field of Classification Search
CPC ... H04M 1/0202; H04M 1/22; H04M 1/0206; H04M 1/0214; H04M 1/0264; H04M 1/23; H04M 1/0283; H04M 1/72544; G06F 1/1647; G06F 1/133; G06F 1/1613; G06F 1/1626; G06F 1/1656; G06F 1/181; G06F 1/1684; H01L 35/00; G09G 2320/041
See application file for complete search history.

(56) References Cited

U.S. PATENT DOCUMENTS

| | | | |
|---|---|---|---|
| 2006/0291167 A1 * | 12/2006 | Lee | ................................ 361/701 |
| 2008/0074383 A1 | 3/2008 | Dean | |
| 2009/0126839 A1 | 5/2009 | Matsuura et al. | |
| 2010/0163542 A1 | 7/2010 | Kwon et al. | |

FOREIGN PATENT DOCUMENTS

| | | | |
|---|---|---|---|
| CN | 1863227 A | | 11/2006 |
| CN | 1863227 | * | 1/2007 |
| CN | 1896809 A | | 1/2007 |

(Continued)

OTHER PUBLICATIONS

International Search Report for PCT/CN2011/077427 dated Nov. 28, 2011.

*Primary Examiner* — Shawntina Fuqua
(74) *Attorney, Agent, or Firm* — Ling Wu; Stephen Yang; Ling and Yang Intellectual Property

(57) ABSTRACT

The present invention discloses a mobile terminal comprising: a color changing layer provided on a surface of a shell of the mobile terminal, the color changing layer showing different colors at different temperatures; and a temperature control module positioned inside the mobile terminal, the temperature control module being connected to the color changing layer to supply heat for the color changing layer. The mobile terminal in accordance with the present invention can change color and odor according to requirements of users of different mobile terminals and environmental changes, thus it has very distinct personalization and is easy to operate.

12 Claims, 1 Drawing Sheet

(56) References Cited

FOREIGN PATENT DOCUMENTS

| | | |
|---|---|---|
| CN | 201178432 Y | 1/2009 |
| JP | 2002359876 A | 12/2002 |
| JP | 2005519462 A | 6/2005 |
| JP | 2005331892 A | 12/2005 |
| JP | 2006304112 A | 11/2006 |
| KR | 20040090649 A | 10/2004 |
| KR | 20080067909 A | 7/2008 |
| KR | 20100130868 A | 12/2010 |
| KR | 20110016005 A | 2/2011 |

* cited by examiner

MOBILE TERMINAL

TECHNICAL FIELD

The present invention relates to a mobile terminal.

BACKGROUND OF THE RELATED ART

With the increasing popularity of mobile terminals such as mobile phones, MP3, MP4 and small game players, more and more manufacturers engage in the mobile terminal field in the market, which, on the one hand, improves the quality of the mobile terminals, and, on the other hand, increases the expected value of consumption of consumers. Since the personalized requirements of the consumers are increasingly strong, the demands for mobile terminals such as mobile phones are not limited to internal conditions such as good quality and complete functions only, and the demand for appearance becomes increasingly high. The consumers tend to pay no attention to mobile terminals such as mobile phones with mediocre or similar appearance design, and show special favor to mobile terminals such as mobile phones with outstanding individuality and appearance and conforming to their own identities. At present, appearances of mobile terminals such as mobile phones usually remain unchanged, one or two shells can be replaced at most, and replacement of the shells is complicated. In addition, at present the appearance of a mobile terminal such as a mobile phone is only limited to shape, and lacks other elements, thus it seems to be very monotonous and no longer meets people's increasing demand for the consumption personality.

SUMMARY OF THE INVENTION

An object of the present invention is to provide a mobile terminal so as to solve the problem of monotonous appearance of the mobile terminal in the prior art.

In order to solve the aforementioned problem, the present invention provides a mobile terminal comprising:

a color changing layer provided on a surface of a shell of the mobile terminal, the color changing layer showing different colors at different temperatures; and a temperature control module positioned inside the mobile terminal, the temperature control module being connected to the color changing layer to supply heat for the color changing layer.

The mobile terminal further comprises a temperature control switch provided on the mobile terminal, the temperature control switch being connected to the temperature control module and controlling actions of the temperature control module.

The mobile terminal further comprises:

fragrance source cavities positioned in the mobile terminal, fragrance sources being stored in the fragrance source cavities;

a fragrance control module positioned in the mobile terminal, one end of the fragrance control module being connected to the fragrance source cavities, and the other end being connected to a fragrance source channel; and a fragrance source channel provided on the shell, the fragrance source channel being connected to the fragrance source cavities via the fragrance control module.

The mobile terminal further comprises a fragrance control switch provided on the mobile terminal, the fragrance control switch being connected to the fragrance control module and controlling actions of the fragrance control module.

The mobile terminal further comprises:

a camera provided on the shell;

a color sensor positioned in the mobile terminal, the color sensor being connected to the camera;

a joint control module positioned in the mobile terminal, one end of the joint control module being connected to the camera, and the other end being connected to the temperature control module and/or the fragrance control module; and a joint control switch provided on the mobile terminal, the joint control switch being connected to the joint control module and controlling actions of the joint control module.

In the mobile terminal in accordance with the present invention, the color changing layer comprises heat-sensitive materials.

In the mobile terminal in accordance with the present invention, the fragrance source channel is tiny air pores positioned in the surface of the shell.

In the mobile terminal in accordance with the present invention, the joint control module comprises:

a storage unit connected to a comparison unit, color information being stored in the storage unit;

a collection unit connected to the camera and the comparison unit respectively, the collection unit collecting color information from information sent by the camera to send to the comparison unit;

the comparison unit connected to the storage unit, the collection unit and an instruction unit respectively, the comparison unit comparing the color information sent by the collection unit with the color information stored in the storage unit to find the most similar color information to send to the instruction unit; and the instruction unit connected to the comparison unit, temperature control module and fragrance control module respectively, the instruction unit generating a control instruction based on the color information sent by the comparison unit to control actions of the temperature control module and fragrance control module.

The mobile terminal in accordance with the present invention, which can change color and odor according to requirements of users of different mobile terminals and environmental changes, have the following advantages.

1. The present invention uses a color changing layer which can change colors under the control of a temperature control module. A user of the mobile terminal can select colors by manipulating the temperature control switch according to his/her own requirements, thus the mobile terminal has very distinct personalization, is easy to operate, and has a wide selection range.

2. The present invention further uses fragrance source cavities to store fragrance sources, which volatilize via a fragrance source channel under the control of a fragrance control module such that the user of the mobile terminal can select odors of the mobile terminal by manipulating the fragrance control switch according to his/her requirements, thus the mobile terminal has very distinct personalization, is easy to operate, and has a wide selection range.

3. The present invention further uses a camera as well as a color sensor to collect colors such that color and odor can be changed according to environment characteristics, so as to bring an amazing visual and olfactory experience to the user of the mobile terminal. Furthermore, the experience is completely automated without the manipulation of the mobile terminal, which is very convenient.

4. The present invention is simple and convenient and applicable to a variety of user groups, meets different visual and auditory requirements, and satisfies the mentality of seeking innovation and change of users of mobile terminals, thus it has a broad market prospect, can be produced in batches, and can be popularized and applied.

PREFERRED EMBODIMENTS OF THE PRESENT INVENTION

In order for objects, technical schemes and advantages of embodiments of the present invention to be understood more clearly, the embodiments of the present invention will be further described in detail in conjunction with the accompanying drawings. It should be noted that in the case of no confliction, the embodiments of the present application and features in these embodiments can be combined with each other arbitrarily.

Figure 1:
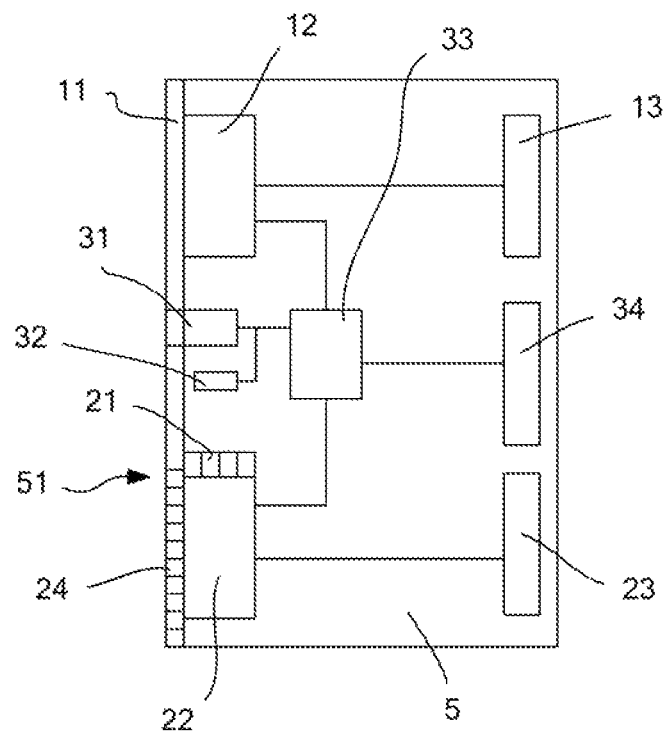
FIG. 1 is a structural diagram of a mobile terminal in accordance with an embodiment of the present invention.

As shown in FIG. 1, a mobile terminal in accordance with an embodiment of the present invention comprises a color changing layer 11, a temperature control module 12 and a temperature control switch 13. The color changing layer 11 is configured to change many colors, the temperature control module 12 is configured to control the color changing layer to change the colors, and the temperature control switch 13 is configured to control actions of the temperature control module manually.

The color changing layer 11 is provided on a surface of a shell 51 of the mobile terminal 5, and can show different colors at different temperatures. The color changing layer 11 can be provided with common colors such as blue, green, red and yellow, or personalized colors such as grass green, sky blue and light grey. The color changing process of the color changing layer 11 is controlled by temperature change. The color changing layer 11 shows different colors at different temperatures. In the present invention, the color changing layer 11 comprises heat-sensitive materials.

The temperature control module 12 is positioned in the mobile terminal 5 and connected to the color changing layer 11, and can supply heat for the color changing layer 11. Different temperature information corresponding to different colors is configured in the temperature control module 12, which supplies heat for the color changing layer 11 according to the required color, and maintains the color constant at this temperature, such that the color changing layer 11 can change colors or keeping the colors constant in different color ranges.

The temperature control switch 13 is provided on the mobile terminal 5 and connected to the temperature control module 12, and controls actions of the temperature control module 12. The temperature control switch 13 facilitates operations of the user of the mobile terminal, so as to change the colors of the mobile terminal 5 according to requirements of the user of the mobile terminal.

The embodiment of the present invention uses the color changing layer 11 which can change colors under the control of the temperature control module 12. The user of the mobile terminal can select colors by manipulating the temperature control switch 13 according to his/her own requirements, thus the mobile terminal has very distinct personalization, is easy to operate, and has a wide selection range.

In the embodiment of the present invention, the mobile terminal further comprises fragrance source cavities 21, a fragrance control module 22, a fragrance control switch 23 and a fragrance source channel 24. The fragrance source cavities 21 are configured to store fragrance sources, the fragrance control module 22 is configured to control connectivity between the fragrance source channel 24 and the fragrance source cavities 21, the fragrance control switch 23 is configured to facilitate operations of the user of the mobile terminal, and the fragrance source channel 24 is configured to volatile fragrance outward.

The fragrance source cavities 21 are positioned in the mobile terminal 5, and the fragrance sources are stored in the fragrance source cavities 21. There are a plurality of fragrance source cavities 21, which are preset in the mobile terminal 5 and closed separately, and are connected to the fragrance source channel 24 via the fragrance control module 22. The main material of the fragrance sources is aromatics, the stock of which is set according to the service life.

The fragrance control module 22 is positioned in the mobile terminal 5, where one end of the fragrance control module 22 is connected to the fragrance source cavities 21, and the other end is connected to the fragrance source channel 24. The fragrance control module 22 can open different fragrance source cavities 21 as needed, so as to generate the corresponding odors.

The fragrance control switch 23 is provided on the mobile terminal 5. The fragrance control switch 23 is connected to the fragrance control module 22, and control actions of the fragrance control module 22. The fragrance control module 23 facilitates operations of the user of the mobile terminal user to choose different fragrances according to his/her requirements.

The fragrant channel 24 is provided on the shell 51, and is connected to the fragrance source cavities 21 via the fragrance control module 22. In the present invention, the fragrant channel 24 is tiny air pores positioned in the surface of the shell 51.

The embodiment of the present invention further uses fragrance source cavities 21 to store fragrance sources, which volatilize via the fragrance source channel 24 under the control of a fragrance control module 22 such that the user of the mobile terminal can select odors of the mobile terminal 5 by manipulating the fragrance control switch 23 according to his/her requirements, thus the mobile terminal 5 has very distinct personalization, is easy to operate, and has a wide selection range.

In the embodiment of the present invention, the mobile terminal further comprises a camera 31, a color sensor 32, a joint control module 33 and a joint control switch 34. The camera 31 is configured to take photographs, the color sensor 32 is configured to perceive colors, the joint control module 33 is configured to control actions of the temperature control module 12 and the fragrance control module 22, and the joint control switch 34 is configured to facilitate operations of the user of the mobile terminal.

The camera 31 is provided on the shell 51, optionally captures corresponding images, and transmits the images to the joint control module 33.

The color sensor 32 is positioned in the mobile terminal 5, and is connected to the camera 31. The color sensor 32 can identify color information of corresponding images to transmit to the joint control module 33 through the camera 31.

The joint control module 33 is positioned in the mobile terminal 5, where one end of the joint control module 33 is connected to the camera 31, and the other end is connected to the temperature control module 12 and the fragrance control module 22. The joint control module 33 can process information according to the color information sent by the camera 31, and generate corresponding instructions to control actions of the temperature control module 12 and the fragrance control module 22 such that the mobile terminal 5 can generate the corresponding color and odor. If the color of the shell 51 of the mobile terminal 5 is yellow, then the odor smells like bananas; if the color of the shell 51 of the mobile terminal 5 is red, then the odor smells like apples; if the color of the shell 51 of the mobile terminal 5 is green, then the odor smells like vanillas, etc. This gives people an immersive experience, thus the effect is better.

The joint control switch 34 is provided on the mobile terminal and connected to the joint control module 33, and controls actions of the joint control module 33. The user of the mobile terminal can control the joint control switch 34 according to his/her requirements, so as to implement joint control of both color and odor.

The embodiment of the present invention further uses the camera 31 as well as the color sensor 32 to collect colors such that color and odor can be changed according to environment characteristics, so as to bring an amazing visual and olfactory experience to the user of the mobile terminal. Furthermore, the experience is completely automated without the manipulation of the mobile terminal, which is very convenient.

Figure 2:
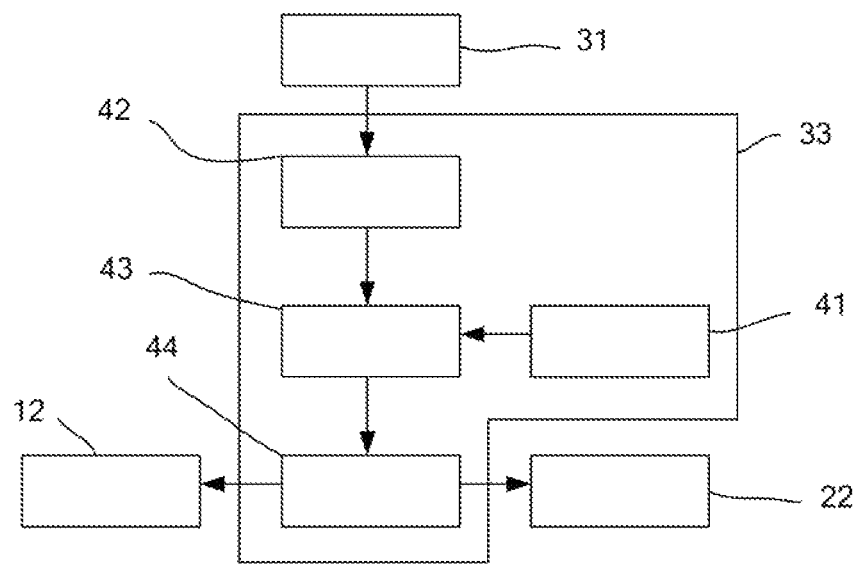
FIG. 2 is a structural diagram of a joint control module in a mobile terminal in accordance with an embodiment of the present invention.

As shown in FIG. 2, in an embodiment of the present invention, the joint control module 33 comprises a storage unit 41, a collection unit 42, a comparison unit 43 and an instruction unit 44. Connection relationships of the units will be described as follows.

The storage unit 41 is connected to the comparison unit 43, and color information is stored in the storage unit 41.

The collection unit is connected to the camera 31 and the comparison unit 43 respectively, and collects color information from information sent by the camera 31 to send to the comparison unit 43.

The comparison unit 43 is connected to the storage unit 41, the collection unit 42 and the instruction unit 44 respectively, compares the color information sent by the collection unit with the color information stored in the storage unit to find the most similar color information to send to the instruction unit 44.

The instruction unit 44 is connected to the comparison unit 43, temperature control module 12 and fragrance control module 22 respectively, and generates a control instruction based on the color information sent by the comparison unit 43 to control actions of the temperature control module 12 and fragrance control module 22.

The present invention is simple and convenient and applicable to a variety of user groups, meets different visual and auditory requirements, and satisfies the mentality of seeking innovation and change of users of mobile terminals, thus it has a broad market prospect, can be produced in batches, and can be popularized and applied.

In summary, the above description is only the preferred embodiments of the present invention and is not intended to limit the present invention. Any modification, equivalent substitution and variation made within the spirit and principle of the present invention should be covered in the protection scope of the present invention.

INDUSTRIAL APPLICABILITY

A mobile terminal in accordance with the present invention can select colors by manipulating the temperature control switch according to the user's requirements, thus it has very distinct personalization, is easy to operate, and has a wide selection range. The mobile terminal in accordance with the present invention has a broad market prospect, can be produced in batches, and can be popularized and applied.

What is claimed is:

1. A mobile terminal comprising:
   a color changing layer provided on a surface of a shell of the mobile terminal, the color changing layer showing different colors at different temperatures; and
   a temperature control module positioned inside the mobile terminal, the temperature control module being connected to the color changing layer to supply heat for the color changing layer;
   wherein the mobile terminal further comprises:
   a camera provided on the shell;
   a color sensor positioned in the mobile terminal, the color sensor being connected to the camera; and
   a joint control module positioned in the mobile terminal, one end of the joint control module being connected to the camera, and the other end being connected to the temperature control module.

2. The mobile terminal according to claim 1, further comprising a temperature control switch provided on the mobile terminal, the temperature control switch being connected to the temperature control module and controlling actions of the temperature control module.

3. The mobile terminal according to claim 1, further comprising:
   fragrance source cavities positioned in the mobile terminal, fragrance sources being stored in the fragrance source cavities;
   a fragrance control module positioned in the mobile terminal, one end of the fragrance control module being connected to the fragrance source cavities, and the other end being connected to a fragrance source channel; and
   a fragrance source channel provided on the shell, the fragrance source channel being connected to the fragrance source cavities via the fragrance control module.

4. The mobile terminal according to claim 3, further comprising a fragrance control switch provided on the mobile terminal, the fragrance control switch being connected to the fragrance control module and controlling actions of the fragrance control module.

5. The mobile terminal according to claim 1, wherein the mobile terminal further comprises:
   a joint control switch provided on the mobile terminal, the joint control switch being connected to the joint control module and controlling actions of the joint control module.

6. The mobile terminal according to claim 1, wherein the color changing layer comprises heat-sensitive materials.

7. The mobile terminal according to claim 3, wherein the fragrance source channel is tiny air pores positioned in the surface of the shell.

8. The mobile terminal according to claim 3, wherein the other end of the joint control module is further connected to the fragrance control module, and the joint control module comprises:
   a storage unit connected to a comparison unit, color information being stored in the storage unit;
   a collection unit connected to the camera and the comparison unit respectively, the collection unit collecting color information from information sent by the camera to send to the comparison unit;
   the comparison unit connected to the storage unit, the collection unit and an instruction unit respectively, the comparison unit comparing the color information sent by the collection unit with the color information stored in the storage unit to find the most similar color information to send to the instruction unit; and the instruction unit connected to the comparison unit, temperature control module and fragrance control module respectively, the instruction unit generating a control instruction based on the color information sent by the comparison unit to control actions of the temperature control module and fragrance control module.

9. The mobile terminal according to claim 2, wherein the mobile terminal further comprises:
a joint control switch provided on the mobile terminal, the joint control switch being connected to the joint control module and controlling actions of the joint control module.

10. The mobile terminal according to claim 3, wherein the mobile terminal further comprises:
a joint control switch provided on the mobile terminal, the joint control switch being connected to the joint control module and controlling actions of the joint control module.

11. The mobile terminal according to claim 4, wherein the mobile terminal further comprises:
a joint control switch provided on the mobile terminal, the joint control switch being connected to the joint control module and controlling actions of the joint control module.

12. The mobile terminal according to claim 4, wherein the other end of the joint control module is further connected to the fragrance control module, and the joint control module comprises:
a storage unit connected to a comparison unit, color information being stored in the storage unit;
a collection unit connected to the camera and the comparison unit respectively, the collection unit collecting color information from information sent by the camera to send to the comparison unit;
the comparison unit connected to the storage unit, the collection unit and an instruction unit respectively, the comparison unit comparing the color information sent by the collection unit with the color information stored in the storage unit to find the most similar color information to send to the instruction unit; and
the instruction unit connected to the comparison unit, temperature control module and fragrance control module respectively, the instruction unit generating a control instruction based on the color information sent by the comparison unit to control actions of the temperature control module and fragrance control module.

* * * * *